US006210733B1

United States Patent
Rosenberger

(10) Patent No.: US 6,210,733 B1
(45) Date of Patent: Apr. 3, 2001

(54) METHOD FOR DIVIDING A CUBED BLOCK OF DEEP FROZEN FOOD INTO PORTIONS WITH A PRECISE VOLUME

(75) Inventor: Jörg Rosenberger, Haltern (DE)

(73) Assignee: Heinz Nienstedt Maschinenfabrik GmbH, Halten (DE)

( * ) Notice: Subject to any disclaimer, the term of this patent is extended or adjusted under 35 U.S.C. 154(b) by 0 days.

(21) Appl. No.: 09/423,586

(22) PCT Filed: Mar. 28, 1998

(86) PCT No.: PCT/EP98/01836

§ 371 Date: Nov. 9, 1999

§ 102(e) Date: Nov. 9, 1999

(87) PCT Pub. No.: WO98/52725

PCT Pub. Date: Nov. 26, 1998

(30) Foreign Application Priority Data

May 22, 1997 (DE) ............................................. 197 21 336
Aug. 5, 1997 (DE) ............................................. 197 33 855

(51) Int. Cl.[7] ..................................................... A23P 1/00
(52) U.S. Cl. .......................................... 426/513; 426/518
(58) Field of Search ................................. 426/512, 513, 426/518, 524

(56) References Cited

U.S. PATENT DOCUMENTS

| 3,924,012 | * 12/1975 | Marshall et al. ................... 426/518 |
| 4,072,763 | 2/1978 | Mart ................................. 426/513 |
| 4,192,899 | 3/1980 | Roth ................................. 426/513 |
| 4,474,823 | 10/1984 | Nishikawa et al. ................ 426/513 |
| 4,626,436 | 12/1986 | Bradley et al. .................... 426/518 |

FOREIGN PATENT DOCUMENTS

| 32 17 159 | 11/1983 | (DE) . |
| 37 90 125 | 3/1988 | (DE) . |
| 196 12 029 | 7/1997 | (DE) . |
| 0 455 134 | 11/1991 | (EP) . |
| 0 647 409 | 4/1995 | (EP) . |

* cited by examiner

Primary Examiner—George C. Yeung
(74) Attorney, Agent, or Firm—Herbert Dunbo

(57) ABSTRACT

In the subdivision of blocks of meat or fish, the pieces in the penultimate subdivision are joined end to end without a gap between them and then finally portioned into the smallest pieces which are shaped in a press. The result is a minimum amount of waste.

4 Claims, 3 Drawing Sheets

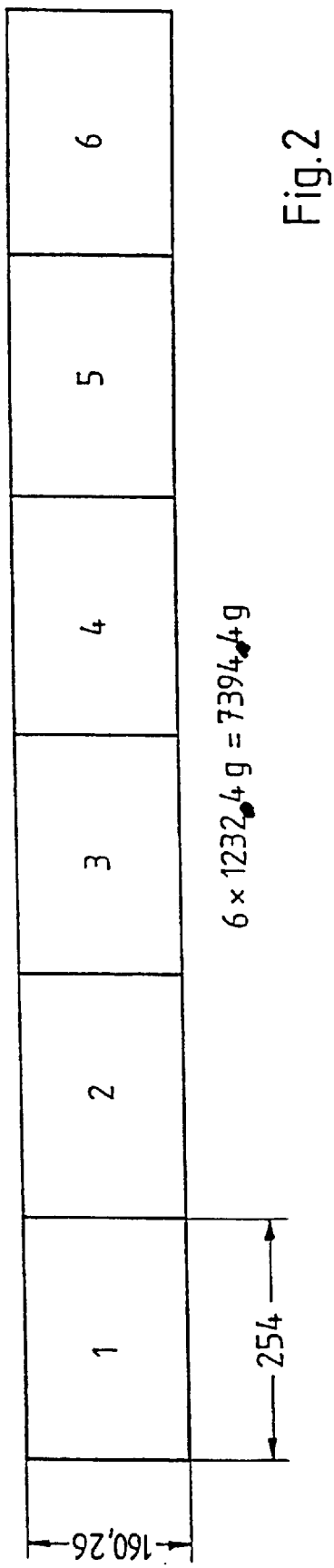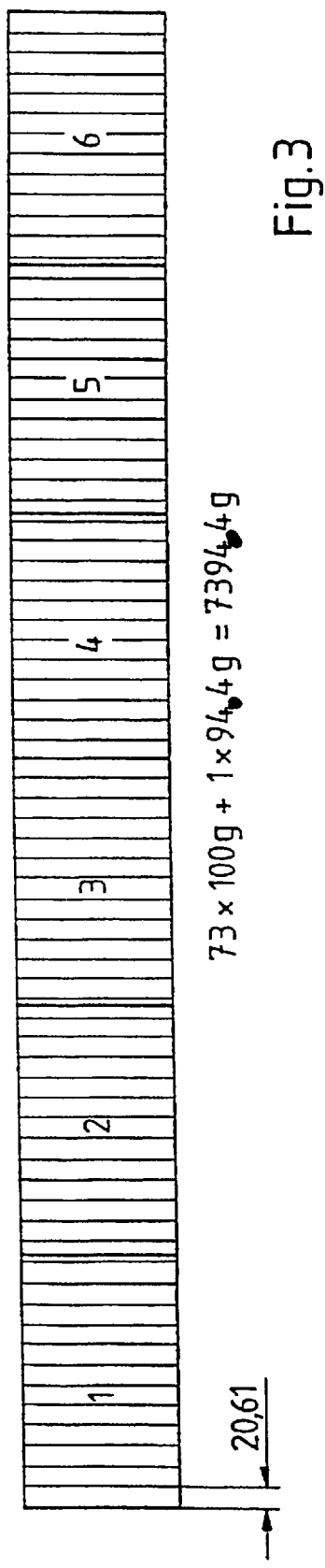

METHOD FOR DIVIDING A CUBED BLOCK OF DEEP FROZEN FOOD INTO PORTIONS WITH A PRECISE VOLUME

CROSS REFERENCE TO RELATED APPLICATIONS

This application is a national stage of PCT/EP 98/01836 filed Nov. 22, 1998 and based upon German National applications 197 21 336.7 of May 22, 1997 and 197 33 855.0 of Aug. 5, 1997 under the International Convention.

FIELD OF THE INVENTION

The invention relates to a process for dividing into portions a rectangular parallelopipedal block of deep frozen food, especially fish or meat, by a multistage subdivision into smaller equal-size and especially parallelopipedal units from stage to stage with straight cut surfaces and whereby finally the smallest units can have a desired final shape by press reforming.

BACKGROUND OF THE INVENTION

A process of this type is known (German patent document DE 43 34 107 C1). In this process and also in other known processes, the pieces resulting from multiple subdivision are cut through with material removal with the material removed being minimized, utilizing the thinnest possible saw blades. The sawing residue is collected and can be applied again to the smaller pieces. This type of minimization of the cutting losses cannot however guarantee in every case a maximum yield of portions from a rectangular parallelopipedal block. This can be seen from an example from practice: from a standard size block (l=482 mm; b=254 mm; h=62.6 mm), a multistage subdivision into ever smaller equal size units or portions with a given minimum weight of 67 g and defined dimensions (l=126.7 mm; b 70/25.32 mm; h=12.06 mm), as a rule a certain overweight must be tolerated; if not, a nonsubdividable residue may remain after portioning.

However, not only the weight but also the volume of the portions is important and, for further processing, should namely the portions have a desired final shape as a result of press reforming, the portions cannot have an excess volume since the product would be overpressed giving a loss in quality. They should not have too small a volume because then the portions will not be satisfactorily reshaped.

OBJECT OF THE INVENTION

It is the object of the invention, therefore, to provide a process for portioning a rectangular parallelopipedal block which on the one hand has an optimum yield and on the other hand has portions of as precise a volume as can be achieved.

SUMMARY OF THE INVENTION

This object is achieved with a process of the type known at the outset, in that in the penultimate subdivision stage, the smaller units previously generated are arrayed into a gapless strand one behind the other and from which in the last subdivision stage the smallest units are subdivided.

With the process of the invention, the cutting planes in the last stage do not have to consider the lengths of the units made in the penultimate stage with respect to the desired weight and the desired volume of the portions and can be subdivided into these portions because the residue of each of the units arrayed in the row and that as a rule does not correspond to the desired weight of a portion is made up by a starting portion of the next unit of the row so that weightwise the portion at the junction of the rows will correspond to the portions of the precise weight desired.

To further increase the yield of such portions, in the last stage the subdivision is via a shearing, free from cutting losses.

For the increased yield it is of advantage when the last subdivision stage is a loss-free shearing. It is not important whether the portions retain their integrity or break up somewhat at the cutting edges. It is also not important whether the food adheres together at the boundary surfaces between the individual slabs or successively arrayed units or not. Since the total volume of the portion remains together for the subsequent pressing operation it is provided that the material from the shearing process be transferred directed to a pressing mold.

Preferably one starts with a block or slab with a length, width and thickness ratio of 1:b:h=8:4:1 which is subdivided in a first subdivision stage into three rectangular parallelopipedal slabs parallel to the small size and that in the second subdivision stage, the slabs are each subdivided perpendicularly or with inclination to the small size into two plates which are rectangular to triangular in cross section and which for that last subdivision stage are disposed one behind the other with their ends in a row. The standard dimensions of such a block are l=482 mm, b=254 mm and h=62.6 mm. By contrast to the known process, with the method of the present invention, such a block is subjected to multiple subdivisions in new cutting planes. The saws which have been found successful in practice, for example band saws, permit a minimum cutting kerf of 0.6 mm to be obtained. With the use of such saws one can obtain from a block of the aforedescribed dimensions, in the first cutting stage, three slabs with a width of 160.26 mm. These slabs can then be longitudinally subdivided once again so that plates of rectangular, trapezoidal or triangular cross section can result. Their maximum thicknesses amount to 31.05 mm. If these plates with the length of 254 mm are arrayed after one another in a row so that a gapfree strand results, then it is possible to shear from this strand portions in the form of 100 g slices with a thickness of 20.61 mm. Since following the last shearing step for each plate, the slice with a weight of less than 100 g will remain, from the gapfree contiguous plate which follows, the slice is sheared off with the weight making up the difference to 100 g so that even in the transition regions from one plate to the next, a weight-precise portion is obtained. With six plates or slabs, 73 portions are formed exactly with the weight of 100 g and only the last portion will have a weight of 94.4 g. Since in practice the strand is endless because the similar subdivision of further blocks is followed by alignment thereof in the row, only at the end of the fabrication process is there a maximum of one portion which does not have precisely the desired weight of 100 g. This means that the yield of portions that have exactly the desired weight and volume is substantially greater than has been customary and in processes which are limited to a single plate at a time. With a large number of plates or slabs forming a strand the yield of plates which can be portioned exactly into 100 g units can approximate 100%.

In the following the invention is described in greater detail in conjunction with a drawing showing an exemplary embodiment.

BRIEF DESCRIPTION OF THE DRAWING

The above and other objects, features, and advantages will become more readily apparent from the following

FIGS. 2 and 3 are plan views showing the principles of the invention; and

SPECIFIC DESCRIPTION

Figure 1:
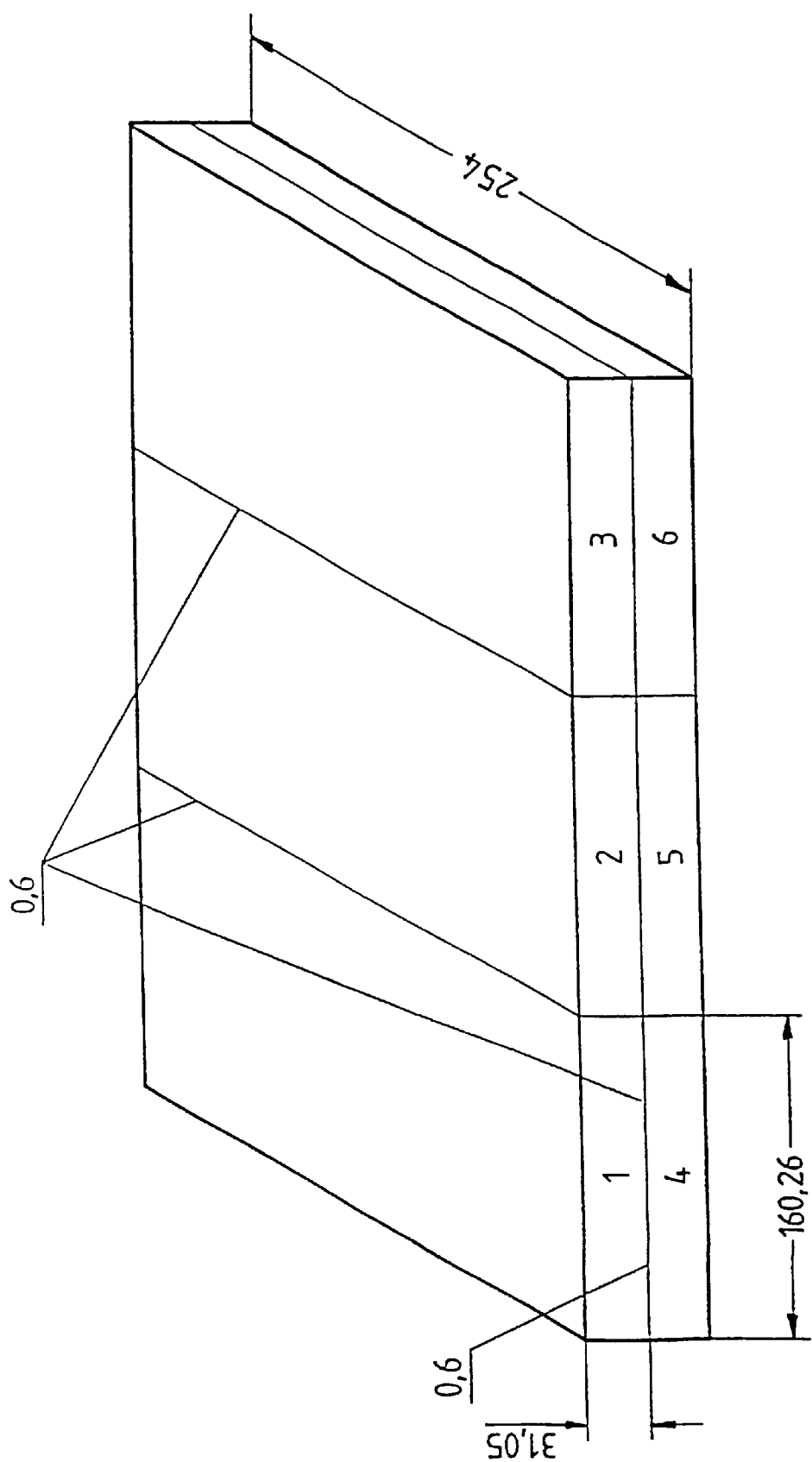
FIG. 1 is a perspective view showing cutting lines according to the invention.

In the accompanying drawing FIG. 1 shows a standard block of deep frozen fish with dimensions of 482 mm×254 mm×62.7 mm and a block weight of 7.484 kg. It is indicated where the individual cutting planes between the slabs 1 to 6 run. The cutting planes between the slabs between 1 and 4, 2 and 5 and 3 and 6 can, as has been shown, run parallel to the broad sides; they can however also be inclined thereto so that in an extreme case, two slabs are obtained which are triangular in cross section. In practice at the present time, band saws are used which have only a very thin kerf of 0.6 mm. The cutting loss is correspondingly small. The removed material can, as is known, be collected and reapplied to the slabs which further minimizes the cutting losses.

In FIG. 2, a strand formed from the slabs 1 to 6 is shown where the slabs are arranged gaplessly one after the other. Considering that in the first two cutting stages losses cannot be completely avoided, the weight of the strand is 7.3944 kg.

In FIG. 3, the strand according to FIG. 2 is shown with the shearing planes indicated. It can be seen that with a slice thickness of 20.61 mm, the shearing planes do not coincide with the planes at which individual slabs 1 to 6 abut. The yield of 100 g portions from six slabs with a thickness of 20.61 mm amounts to 73 pieces with one piece having a weight of 94.4 g. The yield of 100 g portions is thus 99%. This yield can, it will be understood, be raised as more slabs are added to the strand since then the last portion must be divided by the greater total weight in calculating the yield.

Figure 4:
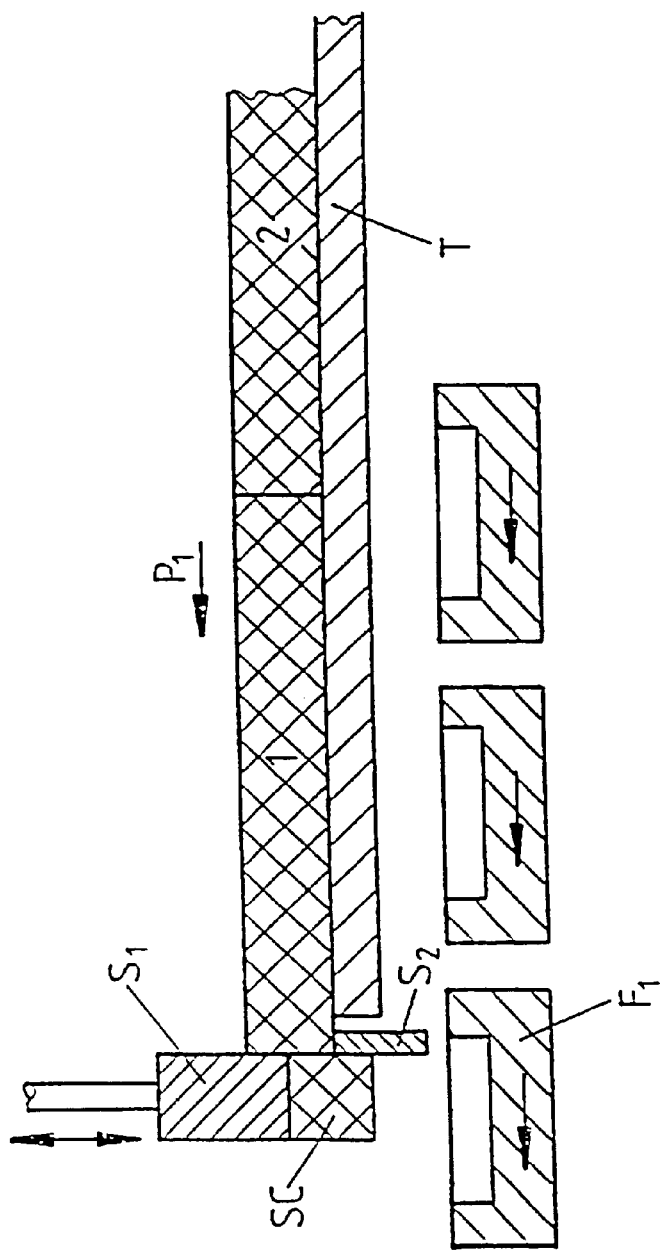
FIG. 4 is a cross sectional view showing an apparatus for practicing the invention.

In FIG. 4 in side view it is shown how the sheared off smallest portions are transferred to a pressing mold. There a stationary table T is provided over which the slabs 1, 2, 3, 4, 5, 6 arrayed in a row is transported in the direction of the arrow P1 to a shear S1, S2. Under the shear S1, S2, trough-shaped lower parts F1 of a pressing mold are transported. When a slice SC is sheared off from the slab 1, it then falls into the trough shaped lower part F1 of the press mold. This lower part with the slices SC is advanced beneath the movable ram F2 whereby the slice is pressed into the desired final shape by the shaping press. Since the trough-shaped part F1 is beneath the shear S1, S2 during the shearing action it is irrelevant whether the deep frozen foodstuff mechanically stressed by the shearing process is embrittled. The entire portion is collected and retained and thus has the desired content when subjected to reshaping in the press. It is important that the slice retain its composition during the shearing process so that no cutting losses occur here as have been avoidable by means of saws or the like.

What is claimed is:

1. A process for portioning a rectangular parallelopipedal block of deep frozen foodstuff selected from fish and meat, comprising the steps of:

(a) subjecting said block to multiple multistage subdivision in smaller equal size rectangular parallelopipedal units with straight cut surfaces from stage to stage into smallest units in a final stage;

(b) reshaping a smallest unit formed in step (a) to a desired final shape in a press; and (c) arraying smaller units resulting from a penultimate subdivision stage in step (a) in a row one behind the other and in direct contact with one another to a gapless strand from which the smallest units are separated from the strand in the final stage in step (a).

2. The process according to claim 1 wherein the separation in the final stage is a shearing of said strand.

3. The process according to claim 2 wherein said smallest units are directly transferred into a pressing mold.

4. The process according to claim 2 wherein said block has a length, width and thickness ratio of 1:b:h=8:4:1 at starting, the block is subdivided into three rectangular parallelopipedal chunks parallel to small sides of the block in a first subdivision stage and in a second subdivision stage the chunks are subdivided perpendicular to the small sides or at an inclination thereto to yield pieces which are rectangular in cross section or triangular in cross section and are arrayed one behind the other with respective smallest ends abutting one another for said final stage.

* * * * *